United States Patent
Sluka et al.

(10) Patent No.: US 9,958,204 B2
(45) Date of Patent: May 1, 2018

(54) SYSTEM FOR TREATING OBJECTS

(71) Applicant: EISENMANN SE, Böblingen (DE)

(72) Inventors: Daniel Sluka, Stuttgart (DE); Reiner Erhardt, Stuttgart (DE)

(73) Assignee: EISENMANN SE, Boeblingen (DE)

( * ) Notice: Subject to any disclaimer, the term of this patent is extended or adjusted under 35 U.S.C. 154(b) by 716 days.

(21) Appl. No.: 14/395,085

(22) PCT Filed: Mar. 27, 2013

(86) PCT No.: PCT/EP2013/000917
§ 371 (c)(1),
(2) Date: Oct. 17, 2014

(87) PCT Pub. No.: WO2013/156105
PCT Pub. Date: Oct. 24, 2013

(65) Prior Publication Data
US 2015/0089827 A1    Apr. 2, 2015

(30) Foreign Application Priority Data
Apr. 20, 2012    (DE) .......................... 10 2012 007 769

(51) Int. Cl.
*F26B 15/14*    (2006.01)
*F26B 23/00*    (2006.01)
(Continued)

(52) U.S. Cl.
CPC ............ *F26B 23/002* (2013.01); *F23G 7/065* (2013.01); *F23L 7/007* (2013.01); *F26B 3/18* (2013.01);
(Continued)

(58) Field of Classification Search
CPC ............ B05B 15/1233; B05B 15/1207; B05B 15/1225; F26B 23/001; F26B 15/14; F26B 23/022; F26B 2210/12
(Continued)

(56) References Cited

U.S. PATENT DOCUMENTS

| | | | |
|---|---|---|---|
| 5,128,003 A | 7/1992 | Murdoch et al. | |
| 9,228,781 B2* | 1/2016 | Weschke ................. | F26B 15/14 |
| 2004/0112741 A1* | 6/2004 | Murdoch ............... | B01D 53/26 |
| | | | 204/265 |
| 2005/0188616 A1* | 9/2005 | Bizjak ..................... | C01B 3/505 |
| | | | 48/127.9 |

(Continued)

FOREIGN PATENT DOCUMENTS

| | | |
|---|---|---|
| DE | 100 39 495 A1 | 2/2002 |
| DE | 102 31 265 A1 | 1/2004 |

(Continued)

*Primary Examiner* — Frank Lawrence, Jr.
*Assistant Examiner* — Minh-Chau Pham
(74) *Attorney, Agent, or Firm* — Schroeder Intellectual Property Law Group, LLC

(57) ABSTRACT

A system for treating objects includes a device for tempering objects in which a tempering tunnel having at least one air outlet and at least one air inlet is arranged in a housing. At least one heating unit, in which a hot primary gas flow can be generated, is assigned to the tempering tunnel, wherein the hot primary gas can be guided into a circulating air heat exchanger, in which air from the tempering tunnel can be heated by hot primary gas as circulating air, which can be fed back to the tempering tunnel in a circuit via the at least one air inlet. The heating unit is coupled in the manner of a combined heating and power plant to an electric generator in such a way that electrical energy is produced during operation of the heating unit.

15 Claims, 1 Drawing Sheet

(51) Int. Cl.
*F23L 7/00* (2006.01)
*F26B 23/02* (2006.01)
*F23G 7/06* (2006.01)
*F26B 3/18* (2006.01)
*F26B 15/12* (2006.01)
*F26B 21/04* (2006.01)

(52) U.S. Cl.
CPC .......... *F26B 23/001* (2013.01); *F26B 23/022* (2013.01); *F23N 2037/02* (2013.01); *F26B 15/12* (2013.01); *F26B 21/04* (2013.01); *F26B 2210/12* (2013.01); *Y02E 20/12* (2013.01); *Y02E 20/14* (2013.01); *Y02E 20/344* (2013.01); *Y02P 70/405* (2015.11)

(58) Field of Classification Search
USPC ...... 55/385.1; 34/60, 86, 380; 204/265, 266; 205/462, 555
See application file for complete search history.

(56) References Cited

U.S. PATENT DOCUMENTS

| | | | |
|---|---|---|---|
| 2007/0217982 | A1* | 9/2007 | Wright ............... B01D 53/0407 423/230 |
| 2010/0239924 | A1* | 9/2010 | McElroy ........... H01M 8/04007 429/423 |
| 2013/0014406 | A1 | 1/2013 | Weschke et al. |
| 2016/0074833 | A1* | 3/2016 | O'Brien .................. B01J 35/06 204/157.52 |

FOREIGN PATENT DOCUMENTS

| | | |
|---|---|---|
| DE | 10 2007 041 944 B3 | 2/2009 |
| DE | 10 2010 001 234 A1 | 7/2011 |
| EP | 0 566 304 A1 | 10/1993 |
| WO | 92/01897 | 2/1992 |
| WO | 2011/092224 A1 | 8/2011 |

* cited by examiner

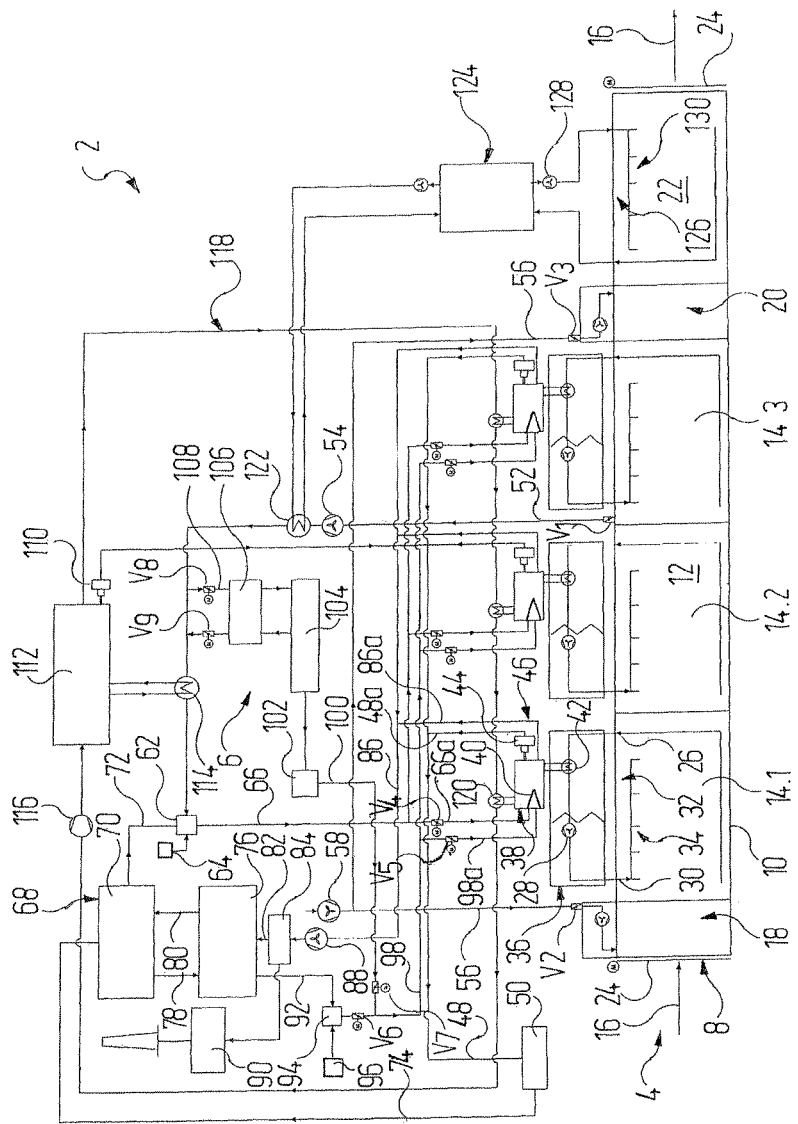

SYSTEM FOR TREATING OBJECTS

RELATED APPLICATIONS

This application is a national phase of International Patent Application No. PCT/EP2013/000917, filed Mar. 27, 2013, which claims the filing benefit of German Patent Application No. 10 2012 007 796.6, filed Apr. 20, 2012, the contents of both of which are incorporated herein by reference.

FIELD OF THE INVENTION

The invention relates to an installation for treating objects having
a) a device for temperature control of the objects, in which a temperature control tunnel is accommodated in a housing, which tunnel comprises at least one air outlet and at least one air inlet;
b) the temperature control tunnel being assigned at least one heating unit, in which a hot primary gas flow can be generated;
c) the hot primary gas being leadable into a circulating air heat exchanger, in which air from the temperature control tunnel can be heated by hot primary gas and can be fed back to the temperature control tunnel as circulating air in a circuit via the at least one air inlet.

BACKGROUND OF THE INVENTION

In such installations known from the market, in particular freshly painted vehicle bodies, but also parts of vehicle bodies or other objects, are dried. Such dryers are heated by sucking, inter alia, air out of the temperature control tunnel and mostly out of tunnel sections which are short in relation to the entire length of the temperature control tunnel, heating it in a heating unit by means of a heat exchanger and feeding it back to the temperature control tunnel or corresponding tunnel sections in a circuit.

When drying freshly painted objects, the air withdrawn from the temperature control tunnel or tunnel section is laden mainly with solvent which is released during the drying process. Coating constituents released during the drying of the objects are also found in this air.

SUMMARY OF THE INVENTION

It is an object of the invention to further develop an installation of the kind mentioned at the outset with a view to efficient energy utilisation and resource utilisation.

This object may be achieved in the case of an installation of the kind mentioned at the outset in that
d) the heating unit is coupled in the manner of a combined heat and power unit to an electric generator in such a way that electrical energy is generated during the operation of the heating unit.

This measure is based on the realisation that, for the heating of the circulating air, mostly only part of the energy contained in the primary gas of the heating unit is utilised. An electric generator can in this case be driven, for example, via a gas turbine which, for its part, is operated by the primary gas flow. As a result, the usable energy generated by the heating unit is used efficiently and electric loads can be supplied with electrical energy without an additional energy source being required for this.

As mentioned, on temperature control of, for example, coated objects, solvents are released which are taken up by the atmosphere prevailing in the temperature control tunnel.

In order for the tunnel atmosphere always to be able to take up solvents from the objects to be dried, without reaching a saturated state, means are provided, by means of which tunnel atmosphere can be sucked out of the temperature control tunnel as exhaust air. Over and above this, however, this measure opens up further possibilities for an efficient energy balance.

In particular, it is favourable when exhaust air can be supplied at least partly to a burner of the heating unit in the form of combustion air. In this way, the heating unit acts, so to speak, as thermal afterburning for the solvents from the temperature control tunnel.

In this case, it is advantageous when a mixing unit is provided, by means of which the exhaust air can be enriched with oxygen $O_2$. In this way, the combustion in the heating unit can be improved.

In this connection, preferably an electrolysis unit is provided, in which oxygen $O_2$ can be electrolytically produced and can be supplied to the mixing unit.

The electrical energy required for the electrolysis in the electrolysis unit is particularly advantageously generated at least partly by the generator. As a result, the energy obtained is efficiently utilised for the operation of the installation.

It is favourable when a Sabatier reaction unit is provided, in which a Sabatier reaction can be carried out. In a Sabatier reaction, methane $CH_4$ and water $H_2O$ are obtained from carbon dioxide $CO_2$ and hydrogen $H_2$, with the result that basic materials for energy-efficient circuits are available again.

In this case, it is particularly favourable when
a) an electrolysis of water can be carried out by means of the electrolysis unit;
b) the electrolysis unit is linked to the Sabatier reaction unit;
c) hydrogen $H_2$ produced in the electrolysis of water being leadable to the Sabatier reaction unit and/or water $H_2O$ produced in the Sabatier process being leadable to the electrolysis unit.

The carbon dioxide $CO_2$ required for the Sabatier process can be obtained particularly advantageously by means of a carbon dioxide separator, by means of which carbon dioxide $CO_2$ can be separated from waste gas of the heating unit and can then be supplied to the Sabatier reaction unit.

Furthermore, it is energetically favourable when methane $CH_4$ produced in the Sabatier reaction unit can be led in the form of combustible gas to a burner of the heating unit.

A further favourable way of generating electrical energy exists when an ORC reactor is provided, in which, in a manner known per se, an Organic Rankine Cycle can be performed, which is coupled to an electric generator in such a way that electrical energy is generated during the operation of the ORC reactor. This electrical can then be fed back to the installation and utilised there.

The ORC reactor can, for its part, be operated energy-efficiently when it is supplied with thermal energy via a heating fluid which can be led in a heating circuit through a heat exchanger, where the heating fluid absorbs waste heat of the heating unit which it releases again as thermal energy in the ORC reactor. In this case, the waste heat of the heating unit which has hitherto still not been used can be additionally utilised as an energy source.

Additionally or alternatively, the ORC reactor can be supplied with thermal energy via a heating fluid which is led through a heat exchanger, where the heating fluid absorbs heat from exhaust air from the temperature control tunnel which it releases again as thermal energy in the ORC reactor.

When the device for temperature control of the objects comprises a cooling tunnel, it is favourable when the latter is cooled by means of an adsorption refrigerating device which can be supplied with thermal energy from the exhaust air of the temperature control tunnel via a heat exchanger circuit, for which exhaust air can be led through a heat exchanger of the heat exchanger circuit.

The overall energy balance of the installation can be further improved when the latter comprises a device for coating objects.

In this case, it is particularly favourable when the installation comprises a pyrolysis device, in which combustible residual materials arising in the coating device can be pyrolysed, resulting in pyrolysis gas,
and
pyrolysis gas can be supplied in the form of combustible gas at least partly to a burner of the heating unit. This means that the combustible gas can comprise methane $CH_4$ from the Sabatier process and/or pyrolysis gas. In this case, the combustible gas can additionally comprise, for example, natural gas which is supplied from an external source.

In a coating device, during the coating of objects, there is formed an atmosphere of process air which is laden with solvent and/or coating substances. This process air must be freed from these undesired constituents. For this, adsorption filter devices are known which, however, for their part have to be regenerated again after adsorption of a maximum amount of solvent or other constituents. For this, in general, the temperature is increased and the adsorbed substances desorb. Thus, when the coating device now comprises an adsorption filter device, by means of which process air of the coating device can be filtered, it is particularly advantageous when a regeneration device is provided, by means of which exhaust air from the drying tunnel can be led through the adsorption filter device for the purpose of regeneration.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention will now be described in more detail below with the aid of the single FIGURE.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In the single FIGURE, 2 denotes as a whole an installation in which objects, not shown specifically, are treated in different treatment zones, of which a drying zone 4 and a coating zone 6 are shown by way of example. In the drying zone 4, for example, the objects painted in the coating zone 6 are dried; the coating zone 6 will be returned to again below. The objects may be, for example, vehicle bodies or parts of vehicle bodies; in principle, however, the concept explained in the following may be applied to the treatment of any objects.

In the drying zone 4 there is situated, as an example of a temperature control device, a dryer 8 with a housing 10, in which a temperature control tunnel in the form of a drying tunnel 12 is accommodated. The drying tunnel 12 comprises a plurality of tunnel sections arranged one behind the other, with three tunnel sections 14.1, 14.2 and 14.3 being shown in the present exemplary embodiment. The drying tunnel 12 may, however, in a manner known per se, also have only one single or two tunnel sections or more than three tunnel sections.

The objects are conveyed by a conveying system (not illustrated) in a conveying direction 16 and first of all pass into an entrance lock 18 and from there into the drying tunnel 12. The objects finally leave the dryer 8 in a dried state through an exit lock 20 after passing through the tunnel sections 14.1, 14.2 and 14.3.

The dryer 8 further comprises a cooling tunnel 22, through which the objects are conveyed after they have left the drying tunnel 12 through exit lock 20.

At the entrance of the entrance lock 18 and at the exit from the cooling tunnel 22, there is provided in each case a motor-operated gate 24, in order to be able to keep to a minimum an exchange of the lock atmosphere and cooling-tunnel atmosphere with the environment.

In the following, the tunnel sections 14.1, 14.2 and 14.3 and components of the installation 2 cooperating therewith will now be explained taking the example of the tunnel section 14.1, with reference symbols also only being provided in that section. What is stated in this regard applies mutatis mutandis to the other tunnel sections 14.2 and 14.3 accordingly.

The drying tunnel 12 has in the tunnel section 14.1 an air outlet 26, via which this tunnel air is sucked out by means of a fan 28. This tunnel air is then fed back into the tunnel section 14.1 again via an air inlet 30, so that tunnel air as a whole is circulated in a circuit 32 as circulating air. The fed-back air is directed, e.g. via nozzles 34, onto the objects to be dried and is normally at a temperature between about 140° C. and 220° C. It is assumed below that the solvent-containing air in the tunnel section 14.1 is at a temperature of about 200° C.

In the circuit 32, the circulating air flows through a conditioning unit 36, in which it is e.g. filtered and freed from entrained particles, as well as optionally humidified or dehumidified, before re-entering the tunnel section 14.2.

In particular, however, the circulating air is heated in the conditioning unit 36, for which the tunnel section 14.1 is assigned a heating unit 38, by means of which air sucked out of the tunnel section 14.1 can be heated before being fed back into the tunnel section 14.1 again.

Owing to the fact that each tunnel section 14.1, 14.2 and 14.3 is assigned its own heating unit 38, different temperatures can be maintained in the tunnel sections 14.1, 14.2, 14.3, as is most favourable in each case for the drying process.

A hot primary gas flow is generated in the heating unit 38 via a burner 40 in a manner known per se. For this, the heating unit 38 is supplied with a combustible gas and combustion air, as will be discussed again below. Primary gas, which is generated in the heating unit 38, is led into a circulating air heat exchanger 42 which is arranged in the circuit 32 of the tunnel air and where the latter is heated by the hot primary gas.

In a modification, not shown specifically, it is also possible for only a single heating unit 38 to be provided for the drying tunnel 12. Optionally, there is then also only a single air outlet 26 and a single air inlet 30. If different temperatures are to be produced with a single heating unit 38 in a plurality of tunnel sections 14, this single heating unit can be assigned a plurality of circulating air heat exchangers 42, by means of which circulating air can be heated to different temperatures.

It is also possible with a further modified modification to produce different temperatures with only a single heating unit 38, and thus also only with a single combined heat and power unit 46, in a plurality of tunnel sections 14. For this, each tunnel section 14 comprises a cold air inlet with a cold air flap valve for not specifically preheated fresh air and a hot air inlet with a hot air flap valve for preheated fresh air. Each tunnel section 14 can be separately supplied with fresh air not preheated or optionally also cooled fresh air, via the cold air inlet. By contrast, each tunnel section can be separately supplied with temperature-controlled fresh air via the hot-air inlet. This temperature-controlled fresh air is, for its part, heated by means of a heat exchanger of the heating unit 38, which corresponds to the circulating air heat exchanger 42 of the heating unit 38 described here. Furthermore, each tunnel section 14 is connected via its own exhaust air outlet to the exhaust air line 52, the exhaust air volume flow from each tunnel section 14 being adjustable via a separate flap valve.

The circulating air for temperature control of the objects can, in this concept, merely be circulated within a specific tunnel section 14 without having to flow through a heat exchanger. In order to adjust the temperature of the circulated tunnel air or the tunnel atmosphere, the flap valves of the cold air inlet, of the hot air inlet and of the exhaust air outlet are coordinated with one another for each tunnel section. The temperature of the tunnel air in a tunnel section 14 can be individually adjusted in dependence on the volume flows of the sucked-out exhaust air and the supplied cold air and hot air. The temperature of the circulated air of each tunnel section 14 is furthermore monitored here in real time by means of a separate temperature sensor, so that it is possible to react immediately to temperature changes of the circulating air in each tunnel section 14 by controlling the flap valves accordingly and changing the volume flows of exhaust air, cold air and hot air.

The heating unit 38 is coupled to an electric generator 44 in such a way that electrical energy is generated by the generator 44 during the operation of the heating unit 38. In this way, a power plant in the manner of a combined heat and power unit 46 known per se is formed. The electrical energy obtained in this manner is led via an electric line 48a into an electric collective line 48 and via the latter to a current storage device 50, from where electrical energy can be retrieved and utilised at a later time. This will be discussed below.

As already mentioned, a solvent-containing atmosphere prevails in the drying tunnel 12. In order for the tunnel atmosphere always to be able to take up solvents from the objects to be dried, without reaching a saturated state, solvent-containing tunnel atmosphere is substantially continuously removed from the drying tunnel 12 and replaced by fresh air.

For this, tunnel atmosphere is sucked out as exhaust air via an exhaust air line 52, in which an exhaust air fan 54 is arranged, while unpolluted fresh air is fed into the drying tunnel 12 via fresh air lines 56 from a fresh air source 58, illustrated as a fan, via the entrance lock 18 and the exit lock 20 of the dryer 8. Dedicated fresh air fans 58 are also present at the entrance lock 18 and the exit lock 20.

In the exhaust air line 52 and in the fresh air lines 56, there is arranged in each case a flap valve V1, and V2 and V3, respectively. The fraction of exhaust air which is sucked out of the drying tunnel 12, and the fractions of the fresh air supplied in each case to the entrance lock or the exit lock 18, 20, can be adjusted via the flap valves V1, V2 and V3.

The exhaust air line 52 leads to a mixing unit in the form of a mixing chamber 62 for combustion air, where the solvent-containing exhaust air is enriched with $O_2$ and optionally humidified with a humidifying device 64. This results in combustion air which is supplied to the burners 40 of each heating unit 38 via in each case a branch line 66a of a branching combustion air line 66. A motor-operated flap valve V4 is arranged in each branch 66a of the combustion air line 66, so that the inflow of combustion air coming from the mixing chamber 62 can be separately adjusted for each burner 40.

The oxygen $O_2$ which is supplied to the exhaust air from the drying tunnel 12 in the mixing chamber 62 comes from an oxygen source 68 which is formed, in the present exemplary embodiment, as an electrolysis unit 70 in which oxygen $O_2$ is produced electrolytically. For this, water $H_2O$ is split electrolytically into hydrogen $H_2$ and oxygen $O_2$ in a manner known per se. The oxygen $O_2$ is led to the mixing chamber 62 via an oxygen line 72. As a result of the combustion air enriched with oxygen in this way, the combustion process in each heating unit 38 is improved.

The electrical energy required for the electrolysis of water is obtained from the generators 44 of the combined heat and power units 46 and led from the current storage device 50 to the electrolysis unit 70 via an electric supply line 74.

The electrolysis of water in the electrolysis unit 70 is linked in a manner known per se to a Sabatier process, which is carried out a Sabatier reaction unit 76 and in which process methane $CH_4$ and water $H_2O$ are obtained from carbon dioxide $CO_2$ and hydrogen $H_2$ in a known manner.

For the Sabatier process, use is made of the hydrogen $H_2$ produced in the electrolysis unit 70 during the electrolysis of water. This hydrogen $H_2$ is supplied to the Sabatier reaction unit 76 via a hydrogen line 78 from the electrolysis unit 70. Conversely, for the electrolysis of water, use is made of the water $H_2O$ obtained in the Sabatier process, which for this is conveyed via a water line 80 from the reaction unit 76 to the electrolysis unit 70.

The carbon dioxide $CO_2$ employed in the Sabatier process in the Sabatier reaction unit 76 passes, via a carbon dioxide line 82, from a carbon dioxide separator 84 to the Sabatier reaction unit 76. In the carbon dioxide separator 84, carbon dioxide $CO_2$ is separated from the exhaust gases of the heating units 38 in a manner known per se. For this, their exhaust gases are removed via exhaust gas lines 86a which merge into an exhaust gas collective line 86 leading to the carbon dioxide separator 84; a fan 88 is arranged in the exhaust gas collective line 86.

The exhaust gases of the combined heat and power units 46 which are freed from carbon dioxide $CO_2$ are led from the carbon dioxide separator 84 to a catalysis unit 90, subjected to catalytic cleaning there and after that discharged via the roof.

The methane $CH_4$ produced in the Sabatier process is led via a gas line 92 to a mixing chamber 94 for combustible gas, where it is mixed with natural gas from a natural gas source 96, whereby combustible gas for the combined heat and power units 46 or their burners 40 is obtained. As a result of the methane CH$_4$ produced, the amount of natural gas required is reduced and resources are saved.

The combustible gas is supplied to the burners 40 of each heating unit 38 from the mixing chamber 94 via in each case a branch line 98a of a branching combustible gas line 98. A motor-operated flap valve V5 is arranged in each branch 98a of the combustible gas line 98, so that the inflow of combustible gas coming from the mixing chamber 94 can be separately adjusted for each burner 40. On the outlet side, the mixing chamber 94 is furthermore assigned a motor-operated flap valve V6, via which the combustible gas amount fed from the mixing chamber 94 into the combustible gas line 98 can be adjusted.

Downstream of the flap valve V6 of the mixing chamber 94, a pyrolysis gas line 100 leads via a flap valve V7 into the combustible gas line 98. Via the pyrolysis gas line 100, pyrolysis gas can be fed into the combustible gas line 98 and mixed there with the gas coming from the mixing chamber 94 to form combustible gas. If the flap valve V6 on the mixing chamber 94 is closed, the burners 40 of the combined heat and power units 46 are supplied with the pyrolysis gas alone as the combustible gas.

The pyrolysis gas is produced in a pyrolysis chamber 102 during the pyrolysis of residual materials which arise in the coating zone 6. As an example of a source of such residual materials, there is shown a coating booth 104 in which objects are provided with a paint coating in a plurality of steps. Examples of usable residual materials which arise there are, inter alia, paint overspray, paint filters, cleaning cloths, wax residues and the like.

During the coating operation, solvents are released in a coating booth 104. In order to remove these solvents from the coating booth 104, the latter is subjected to a through-flow of booth air which is led through the coating booth 104 in a manner known per se and leaves the latter as solvent-containing process air. In order to remove the solvents from the process air again and in order to be able to recycle the booth air, the process air from the coating booth 104 is led through an adsorption filter unit 106, for example an activated carbon filter, and filtered in the process. In the adsorption filter unit 106, a filter medium adsorbs solvents or other gaseous impurities. From time to time, such a filter medium has to be regenerated and freed from adsorbed solvents and other impurities.

For this purpose, a bypass line 108 branches off from the exhaust air line 52 from the drying tunnel 12 as a regeneration device, via which exhaust air from the drying tunnel 12 can flow through the filter unit 106 in a counterflow to the process air from the coating booth 104. At the temperature of the hot exhaust air, the filter medium desorbs adsorbed solvent and other impurities again, which are then taken up by the hot exhaust air and removed from the filter. The exhaust air then carries along with it the solvent and any further gaseous impurities when it passes to the mixing chamber 62 for the combustion air.

In this way, the filter used is thermally cleaned by the exhaust air from the drying tunnel 12. In the bypass line 108 there are arranged downstream and upstream of the filter unit 106 motor-operated flap valves V8 and V9, respectively, so that the volume flow of exhaust air through the filter unit 106 can be adjusted and a back-flow of solvent-laden exhaust air into the filter unit 106 can be prevented when the flap valve V8 is closed during filtering operation.

Besides the generators 44 of the combined heat and power units 46, an ORC generator 110 contributes to the electrical energy required for the electrolysis of water in the electrolysis unit 70. This ORC generator 110 is operated in a manner known per se by means of an Organic Rankine Cycle (ORC) which is operated as a low-temperature ORC process in an ORC reactor 112 at temperatures from about 80° C. A working fluid of the ORC process drives a gas turbine, not shown specifically, which in turn is coupled to the generator.

The thermal energy required for evaporation of the working fluid of the ORC process is partly obtained via a heat exchanger 114, which is arranged in the exhaust air line 52 and through which the exhaust air flows on its way to the mixing chamber 62 for combustion air. For this purpose, a heating fluid is led through the heat exchanger 114, the fluid absorbing heat from the exhaust air there and releasing it again as thermal energy in is the ORC reactor 112. As a result, the exhaust air from the drying tunnel 12 can furthermore be cooled to about room temperature and at this temperature led to the combined heat and power units 46 as combustion air, whereby a stable operation of the combined heat and power units 46 is possible.

Furthermore, the thermal energy required for the ORC process is also obtained from the waste heat of the combined heat and power units 46. For this, a heating fluid is led from the ORC reactor 112 by means of a pump 116 in a heating circuit 118 through heat exchangers 120 of the heating units 38 and back to the ORC reactor 112. The heat exchangers 120 are, for example, lubricating-oil or cooling-water heat exchangers, via which waste heat of the heating units 38 is now transmitted to the heating fluid of the ORC process, and then released again as thermal energy in the ORC reactor 112.

The electrical energy generated by means of the generators 44 of the combined heat and power units 46 and the ORC generator 110 can be used for all electric loads present. In the present exemplary embodiment, these are in particular the motor-operated flap valves and the fans.

The exhaust air from the drying tunnel 12 is also led through a further heat exchanger of a heat exchanger circuit 122, via which an adsorption refrigerating device 124 is supplied with thermal energy which is assigned to the cooling tunnel 22. The adsorption refrigerating device 124 cools a circulating air flow which is sucked out of the cooling tunnel 22 in a cooling circuit 126 by means of a fan 128 and is led to the adsorption refrigerating device 124. After its cooling, the circulating air is delivered back to the cooling tunnel 22 and via a nozzle arrangement 130 to the objects to be cooled.

In a modification, not shown specifically, the heating unit 38 is a fluidised-bed combustion plant, as known per se. In this case, residual materials with a sufficient heating value which arise in the coating zone 6, e.g. in the coating booth 104, can be employed as substitute fuel, in addition to separately supplied fossil fuels.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:
1. Installation for treating objects comprising:
 a) a device for temperature control of the objects, in which a temperature control tunnel is accommodated in a housing, the temperature control tunnel comprising at least one air outlet and at least one air inlet;

b) the temperature control tunnel being assigned at least one heating unit, in which a hot primary gas flow can be generated;

c) the hot primary gas being leadable into a circulating air heat exchanger, in which air from the temperature control tunnel can be heated by hot primary gas and can be fed back to the temperature control tunnel as circulating air in a circuit via the at least one air inlet, d) a Sabatier reaction unit is provided, in which a Sabatier reaction can be carried out wherein e) the heating unit is coupled in the manner of a combined heat and power unit to an electric generator in such a way that electrical energy is generated during the operation of the heating unit, and f) methane $CH_4$ produced in the Sabatier reaction unit is used to produce a combustible gas which is provided to a burner of the heating unit.

2. The installation for treating objects according to claim 1, wherein means are provided, by means of which tunnel atmosphere can be sucked out of the temperature control tunnel as exhaust air.

3. The installation for treating objects according to claim 2, wherein exhaust air can be supplied at least partly to a burner of the heating unit in the form of combustion air.

4. The installation for treating objects according to claim 3, wherein a mixing unit is provided, by means of which the exhaust air can be enriched with oxygen $O_2$.

5. The installation for treating objects according to claim 4, wherein an electrolysis unit is provided, in which oxygen $O_2$ can be electrolytically produced and can be supplied to the mixing unit.

6. The installation for treating objects according to claim 5, wherein electrical energy required for the electrolysis in the electrolysis unit is generated at least partly by the electric generator.

7. The installation for treating objects according to claim 6, wherein a) an electrolysis of water can be carried out by means of the electrolysis unit;

b) the electrolysis unit is linked to the Sabatier reaction unit;

c) hydrogen $H_2$ produced in the electrolysis of water being leadable to the Sabatier reaction unit and/or water $H_2O$ produced in the Sabatier process being leadable to the electrolysis unit.

8. The installation for treating objects according to claim 7, wherein a carbon dioxide separator is provided, by means of which carbon dioxide $CO_2$ can be separated from exhaust gas of the heating unit and can be supplied to the Sabatier reaction unit.

9. The installation for treating objects according to claim 1, wherein an ORC reactor is provided, in which an Organic Rankine Cycle can be performed, which is coupled to an electric generator in such a way that electrical energy is generated during the operation of the ORC reactor.

10. The installation for treating objects according to claim 9, wherein the ORC reactor can be supplied with thermal energy via a heating fluid which can be led in a heating circuit through a heat exchanger, where the heating fluid absorbs waste heat of the heating unit which it releases again as thermal energy in the ORC reactor.

11. The installation for treating objects according to claim 9, wherein the ORC reactor can be supplied with thermal energy via a heating fluid which is led through a heat exchanger, where the heating fluid absorbs heat from exhaust air from the temperature control tunnel which it releases again as thermal energy in the ORC reactor.

12. The installation for treating objects according to claim 2, wherein the device for temperature control of the objects comprises a cooling tunnel which is cooled by means of an adsorption refrigerating device which can be supplied with thermal energy from the exhaust air of the temperature control tunnel via a heat exchanger circuit, for which exhaust air can be led through a heat exchanger of the heat exchanger circuit.

13. The installation for treating objects according to claim 1, wherein the installation further comprises a device for coating objects.

14. The installation for treating objects according to claim 13, wherein the installation comprises a pyrolysis device, in which combustible residual materials arising in the coating device can be pyrolysed, resulting in pyrolysis gas, and pyrolysis gas can be supplied in the form of combustible gas at least partly to a burner of the heating unit.

15. The installation for treating objects according to claim 13, wherein the coating device comprises an adsorption filter device, by means of which process air of the coating device can be filtered, a regeneration device being provided, by means of which exhaust air from the drying tunnel can be led through the adsorption filter device for the purpose of regeneration.

* * * * *